Nov. 3, 1959 J. P. PHILLIPS ET AL 2,911,519
REMOTE CONTROLLED HOSPITAL LIGHT
Filed Sept. 18, 1956 6 Sheets-Sheet 1
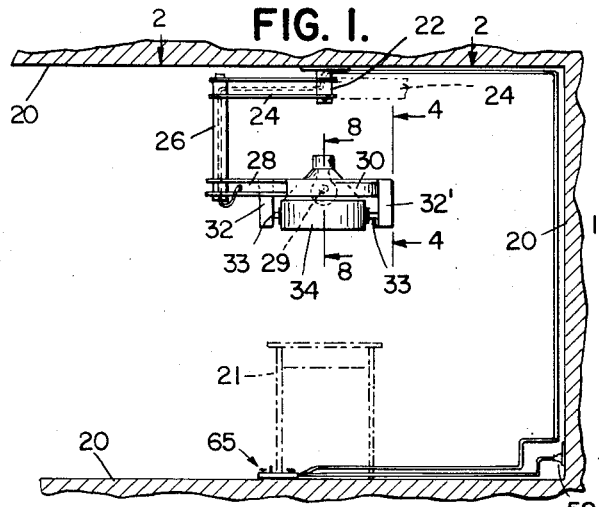
FIG. 1.
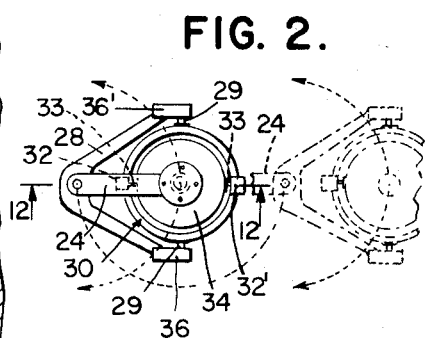
FIG. 2.
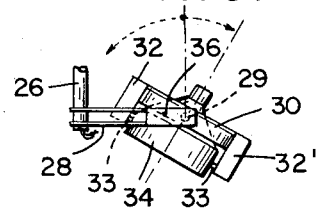
FIG. 3.
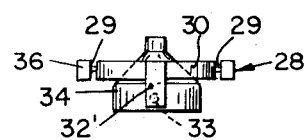
FIG. 4.
FIG. 5.
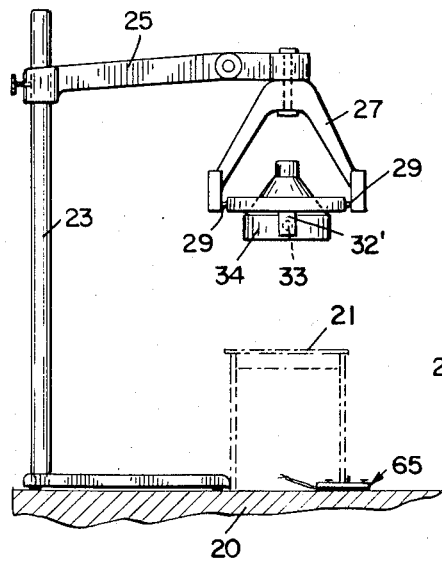
FIG. 6.
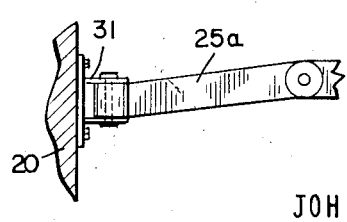
FIG. 7.
INVENTORS
JOHN P. PHILLIPS
CARL E. EBERT
BY
*Albert J. Fihe*
ATTORNEY

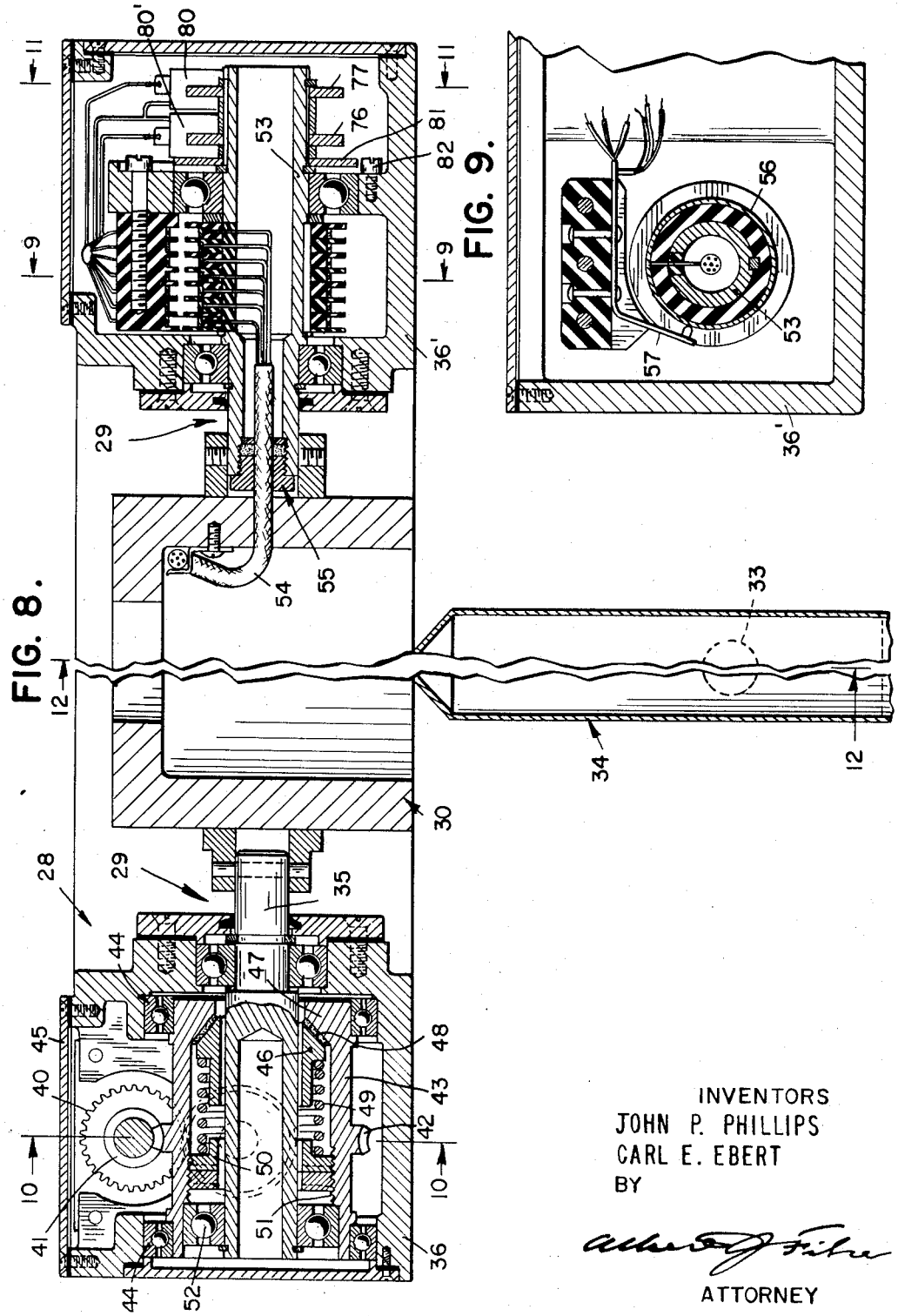

Nov. 3, 1959     J. P. PHILLIPS ET AL     2,911,519
REMOTE CONTROLLED HOSPITAL LIGHT

Filed Sept. 18, 1956

INVENTORS
JOHN P. PHILLIPS
CARL E. EBERT
BY

ATTORNEY

Nov. 3, 1959     J. P. PHILLIPS ET AL     2,911,519
REMOTE CONTROLLED HOSPITAL LIGHT
Filed Sept. 18, 1956     6 Sheets-Sheet 4

INVENTORS
JOHN P. PHILLIPS
CARL E. EBERT
BY

ATTORNEY

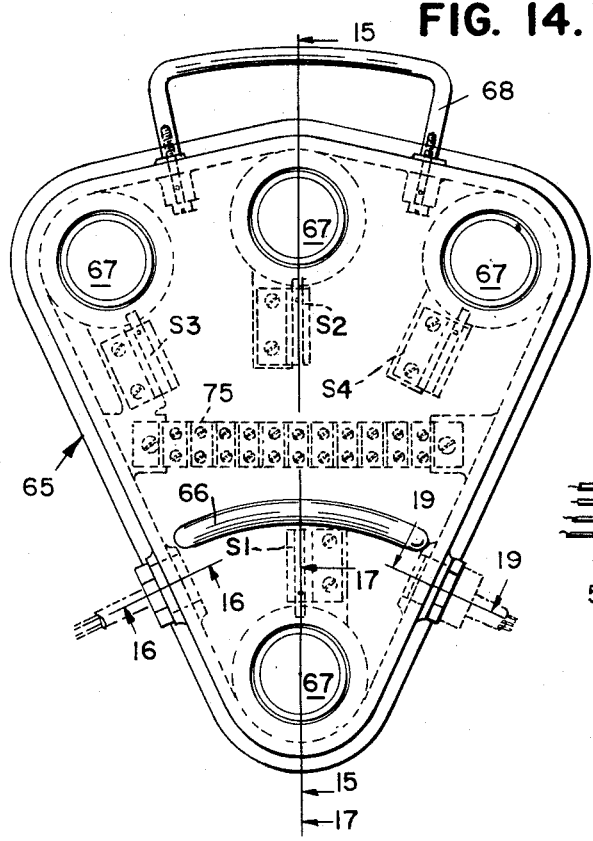
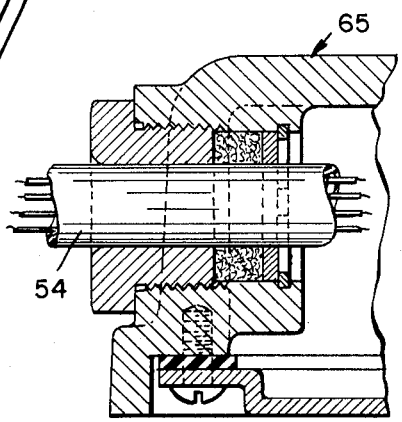
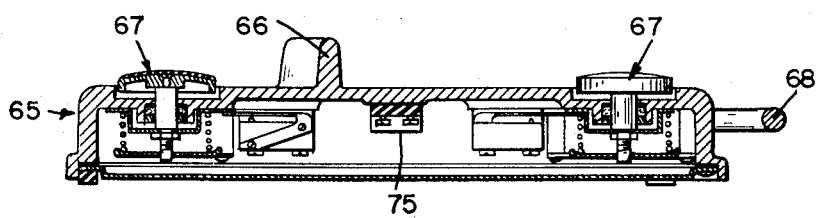

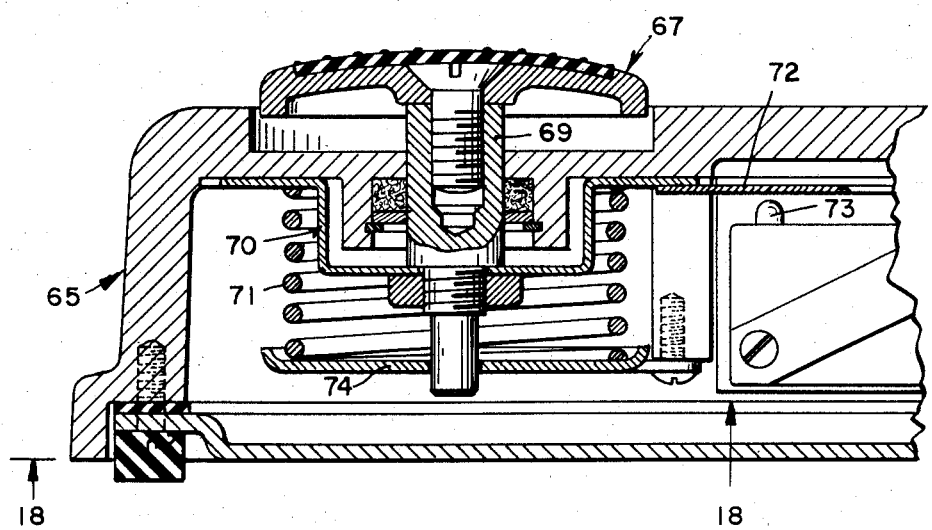
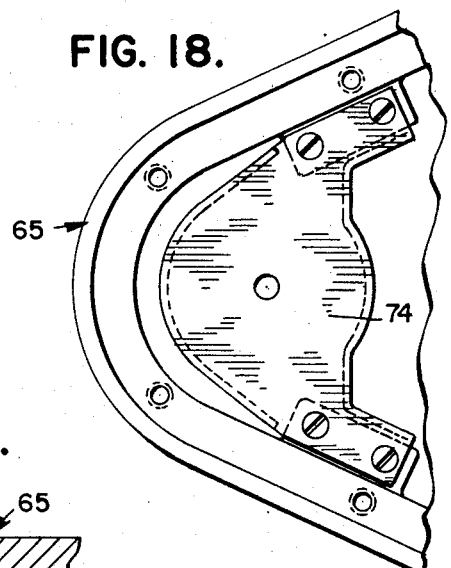
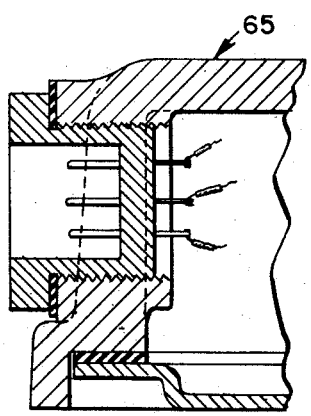

United States Patent Office 2,911,519
Patented Nov. 3, 1959

2,911,519

REMOTE CONTROLLED HOSPITAL LIGHT

John P. Phillips, North Hollywood, and Carl E. Ebert, Studio City, Calif., assignors of one-third to Rodney Perdew, Encino, Calif.

Application September 18, 1956, Serial No. 610,528

1 Claim. (Cl. 240—1.4)

This invention relates to a remote controlled light and has for one of its principal objects the provision of a foot controlled source of illumination which is particularly valuable in hospital operating rooms.

One of the important objects of this invention is to provide a means and mechanism for controlling and positioning a light source, group of lamps or the like, from a remote point, and has particular reference to surgical or operating table illumination.

Another object is to provide a foot operated control for positioning and moving the source of light and the actuating assembly as desired.

Another object is the provision, in a device of the class described, of hermetically sealed control and actuating units, whereby there will be no possibility of an explosion when inflammable gases are employed in connection with the operation.

Still another object is to provide a unit for the purpose intended which will employ practically all standard mechanical and electrical components, thereby eliminating the necessity of custom built parts, which would increase the final cost.

A further object is the provision of a foot operated control mechanism, leaving the surgeon's hands free, and which mechanism occupies a minimum of space, is light weight and readily portable.

Another object is to provide in the manually operated control, an electrical switching interlock to prevent the undesirable application of opposing voltage to the operating motors.

Still another object of the invention is the provision of a lamp assembly actuating mechanism, which can be mounted in any convenient place such as a ceiling, a wall or even incorporated into a portable floor stand.

A further object is to provide a lamp actuating mechanism particularly for hospital operations which, after the initial starting location has been manually accomplished, is then capable of moving the light beam through a complete circular arc of 360 degrees in any direction.

An additional object is to provide an actuating mechanism as above described which will incorporate circuit limit switches, whereby rotation of the mechanism may be limited to a pre-determined arc in any direction.

Still another object is to provide in the structure, mechanical stops which, when pre-set, will limit rotation of the light beam to any desired portion of an arc.

Another object is to incorporate into the actuating mechanism a series of rotatable current carrying elements or commutators, which will eliminate the necessity of connecting cables between the moving parts.

Still another object is to provide in the structure compact high torque geared head motor drives, which will bring the final speed of movement down to the desired or necessary minimum.

Yet another object is the provision in connection with the geared motor drive of a worm gear and wheel combination, which, in addition to providing a high reduction ratio, will automatically stop and hold the light beam in any desired position as soon as the controlling movement ceases.

Another and still further important object of the invention is to provide in the mechanism an overriding clutch between the worm gear reduction and the output shaft, which clutch is adjustably spring loaded, thereby preventing any damage to the motor and gear train in the event that, due to inadvertence or otherwise, the motive power is continued beyond a mechanical stop, or in the event of some mechanical failure in the actuating system or the control itself, or may be manually positioned.

Another object is to provide for suspension of all rotating parts on ball bearings for smooth and silent operation, and to provide suitable counter-balance of all the parts.

Still another object is to provide a construction including cover plates properly gasketed for vapor sealing which, however, will allow ready access to the operating parts for inspection and service.

Other and further important objects of the invention will be apparent from the disclosures in the accompanying drawings and following specification.

The invention, in a preferred form, is illustrated in the drawings and hereinafter more fully described.

In the drawings:

Figure 1 is a view of the remote controlled light of this invention showing the same as used in connection with an operating table in a hospital.

Figure 2 is a view taken on the plane of the line 2—2 of Figure 1, looking downwardly and showing certain of the arcs through which movement of the light source is possible.

Figure 3 is a detail view illustrating one arc of movement of the lamp and reflector which can be accomplished by the foot control mechanism of this invention.

Figure 4 is a vertical section on the line 4—4 of Figure 1, looking in the direction indicated by the arrows.

Figure 5 is a view of the structure of Figure 4, but showing the parts in a different position due to the control of this invention.

Figure 6 is an elevation of a pedestal means for supporting the improved remote control hospital lamp of this invention.

Figure 7 is a view illustrating one method of supporting the entire mechanism on the wall of a room.

Figure 8 is an enlarged view practically all in section, taken on the plane of the line 8—8 of Figure 1, and illustrating most of the essential details of the lamp moving apparatus of this invention. Parts are broken away.

Figure 9 is a vertical section on the line 9—9 of Figure 8, looking in the direction indicated.

Figure 12 is a vertical section on the line 12—12 of Figure 8, showing the lamps or other source of light, together with the reflector and part of the motive power for shifting the lamps and reflector as desired. This is also an enlarged showing taken on the line 12—12 of Figure 2.

Figure 13 shows a preferred form of wiring diagram for operating the mechanism of this invention.

Figure 14 is a top view with certain interior parts shown in dotted lines of the foot control element, which forms an important part of the structure of this invention.

Figure 15 is a slightly reduced section on the line 15—15 of Figure 14.

Figure 16 is an enlarged section on the line 16—16 of Figure 14, looking in the direction indicated.

Figure 17 is an enlarged view of the line 17—17 of

Figure 10:
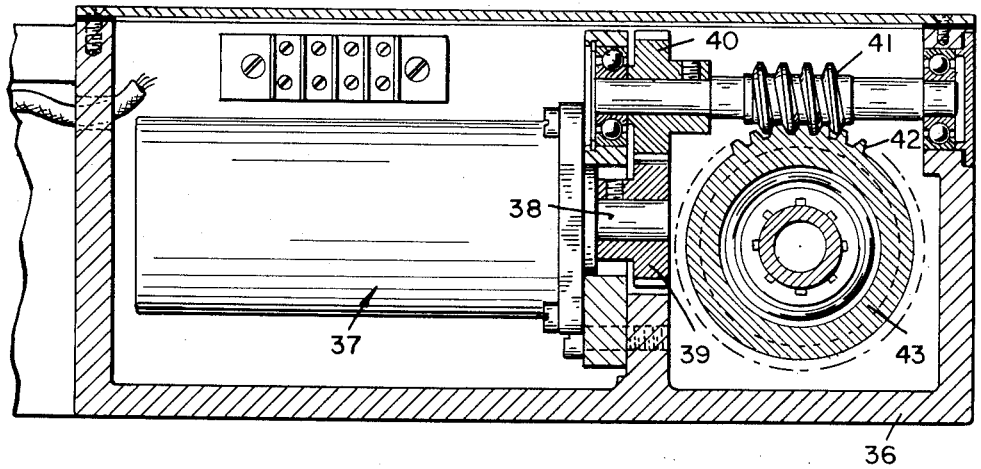
Figure 10 is a vertical section on the line 10—10 of Figure 8, looking in the direction indicated.

Figure 14, and showing certain parts of the structure of Figure 15 in more detail.

Figure 18 is a view on the broken line 18—18 of Figure 17, looking upwardly.

Figure 19 is an enlarged section on the line 19—19 of Figure 14, illustrating certain details of the explosion proof electrical connections.

As shown in the drawings:

The reference numeral 20 indicates generally the ceiling, one wall, and floor of a representative operating room in practically any hospital having an operating table 21 therein.

The remote controlled lamp of this invention is, in this embodiment, shown as supported by a stud 22 in the ceiling 20. An arm 24 is rotatably mounted on the stud 22, and this includes a swivel frame element 26 having a lower fork suspension 28, which in turn supports a horizontally rotatable ring 30.

Figure 2 shows the various positions to which the structure may be moved as desired, this being usually done by hand and simply as a preliminary positioning.

As best shown in Figures 3, 4 and 5, the ring 30 includes two downwardly extending supports 32 having pivots 33, which in turn support the reflector and lamp housing 34. It will be noted that the ring 30 is pivotally supported between the bifurcations of the fork 28 on shafts 29, and the extensions 32 of the ring 30 provide a similar pivotal arrangement at 33 for the actual reflector 34. In this manner a practically universal movement of the beam of light from the lamp can be accomplished.

In Figure 6 a floor stand 23 is provided having an overhanging arm 25 which supports the lamp 34, the ring 30 and their appurtenances. In this case a slightly different fork support 27 is employed.

In Figure 7 a support 25A is fastened to the wall 20 of the operating room by bracket 31.

As best shown in Figure 8, the ring 30 with its reflector 34 is moved about the pivot points 29 by means of a shaft 35, and the ends of the fork 28 include housing 36 for a motor 37 (Figures 10 and 13). This motor 37 includes as a part of its construction a speed reduction gear (not shown). By means of this speed reduction gear, a shaft 38 (Figure 10) is rotated and this shaft, by means of gears 39 and 40, drives a worm 41 which is in mesh with the worm gear 42 which is fastened to, or forms a part of, a cylindrical housing 43 (Figures 8 and 10).

This inner cylindrical housing 43 is supported in the outer rectangular motor housing 36 by ball bearings 44, and a suitable cover plate 45 is provided for ready access to the interior of the housings.

The shaft 35 extends into the cylindrical housing 43 and supports one portion of a clutch element 46, which cooperates with the corresponding portion 47 forming an integral part of the cylindrical housing 43. A suitable clutch facing 48 is provided, and a helical spring 49 surrounds the clutch element 46, having its rear end supported by a sleeve 50 which can be adjustably shifted in a screw threaded section 51 of the cylindrical housing 43. The shaft 35 and the clutch elements 46 and 50 are supported on ball bearings 52, likewise suitably positioned in the corresponding housing structures.

It will be noted that the inner portion of the shaft 35 is hollow, and that the clutch elements 46 and 50 are slidable on this hollow portion, being properly keyed thereto.

Opposed to the shaft 35 and in the corresponding pivotal mounting 29 of the ring 30 is a hollow shaft 53 (Figure 8). The current carrying control wires 54 pass through this hollow shaft 53, and are securely sealed and gasketed at 55.

Each of the wires comprising the cable 54 terminates in a brush which contacts an individual rotor 56 (Figure 9), these rotors being mounted on the shaft 53, and the rotors in turn carry current from the individual wires by means of a brush or other contact element 57 (Figure 9). The cable 54 carries current to the motor 37 and to the lamps. The current being derived from a usual source as indicated at 58 in Figure 1.

By referring to Figure 12, it will be noted that an additional motor 59 is provided in the ring support 32' which has the same system of spur and worm gears as that previously described, whereby the reflector 34 with the lamps or other source of illumination 61 can likewise be rotated about the pair of pivot points 33.

A switch housing 63 is provided for proper current carrying facilities which is substantially the same as that built into the fork 28 but with fewer contacts.

The wiring diagram of Figure 13 indicates a source of current at 58, a double switch 64 which is properly positioned on the wall of the operating room, and a series of switches S1, S2, S3 and S4 in the foot control element 65 as also indicated in Figure 1.

Current carrying wires then lead through the cable 54 to the rotors and other contact elements previously described for driving the motors 37 and 59. The motor 37, through its speed reduction gear, moves the ring 30, and the motor 59 through its speed reduction gear moves the reflector 34, providing a practically universal movement of the light beam which can be controlled to a high degree of accuracy.

This control is accomplished by the foot of the surgeon or other operator which is placed upon the foot control element 65 (Figures 1 and 14) with the instep of the operator's shoe on a rest which comprises a protuberance 66.

The switch element S1 is in the control 65 and directly under the heel of the operator's shoe when the shoe is properly positioned on the rest 66. The toe of the operator's shoe is over the switch element S2 and switches S3 and S4 can be readily operated by shifting the toe from right to left or vice versa and pressing the corresponding switch buttons, one of which is better indicated at 67 in Figure 17. A handle 68 is on the foot control element 65 whereby the same can be readily carried or moved from place to place as occasion arises or necessity demands.

Referring now more particularly to Figure 17, it will be noted that the control button 67 has a downward extension 69 fastened to a cup shaped element 70 beneath which is positioned a helical spring 71.

Pressure on the button 67 from any direction will move the cup shaped element 70 downwardly and actuate a switch lever 72 which in turn actuates push button 73 of the switch.

A fixed abutment 74 is provided for supporting the spring 71 in proper position and all of the parts are properly sealed against ingress of explosive gases, while at the same time providing suitable electrical current carrying connections as shown in more detail in Figures 16 and 19.

A terminal block 75 is provided in the casing 65 for handling the various current carrying connections as best shown in Figure 15.

Figure 11:
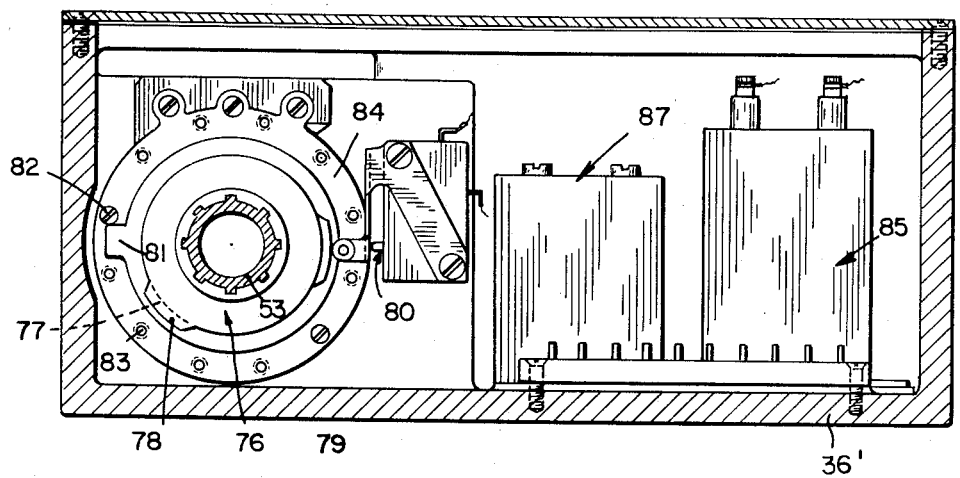
Figure 11 is a section on the line 11—11 of Figure 8, showing other details of construction.

Both electrical and mechanical means are provided to prevent undesirable extensions of movement of any of the parts operated by the motors 37 and 59, such means being best shown in Figures 8 and 11 and comprising cams 76 and 77 mounted on the shaft 53. Each of these cams includes an extension or lobe 78 and 79 respectively, and if motion of the shaft 53 with the cams 76 and 77 inadvertently continues beyond a pre-determined point, the switch elements 80' (Figure 11) will be actuated, stopping rotation of the motor 37.

This construction also includes a mechanical stop 81 which comprises a lobe or an extension on one of the cams which is adapted to contact a screw head or bolt 82, which can be preliminarily fitted into any one of a number of openings 83 in a fixed plate 84, all as best shown in Figure 11.

If by inadvertence, rotation is allowed to continue beyond such a pre-determined point, the cam element or lobe 81 will contact the stop 82 and no further rotation of the shaft 53, the ring 30 or the shaft 35 will be permitted. Even though the motor 37 continues to operate, the clutch 46—47—48 will simply slip and no damage to the mechanism will result. Furthermore, the light beam will remain in its desired pre-determined position.

Similar mechanical and electrical safety stops are provided for the motor 59 and its appurtenances as indicated in the wiring diagram of Figure 13. In this diagram the switches for the motor 37 are shown at S5 and S6, and the switches for the motor 59 are shown at S7 and S8. Capacitors for the motors are indicated in the wiring diagram as C1 and C2 and by the reference numeral 85 in Figure 11. The lamps or other sources of illumination are indicated at L1 and L2 in Figure 13, and by the reference numeral 61 in Figure 12, and necessary ground connections for safety purposes are shown at 86 in Figure 13.

It will be evident that herein is provided a device which enables a surgeon to control the illumination of portions of the human body upon which he is working without taking his hands from the actual work, and by simple foot movements which can be readily acquired with little practice. Also, another operator may be able to provide the same foot controls at the orders of the surgeon if such is preferred.

The surgeon working with sterile equipment and gloves cannot personally make adjustments of the lights without the equipment of this invention.

It will be understood that this equipment is not confined to use in operating rooms in hospitals, but may be applied with little or no change to other commercial, industrial or even home uses wherever such a system would be advantageous.

Any number of lamp units can also be provided by including the required number of electrical and mechanical elements.

The fact that the forks, rings, reflector and other supports can be moved through substantially 360 degrees of rotation enables a universal adjustment and the switch and motor housings are preferably positioned in an angular relationship so as to reduce the radius or arc of rotation to a minimum. Obviously helical, spiral or other suitable gears can be employed to facilitate this arrangement.

The actual size of the units may vary from rather small elements for dental or similar work to extremely large units for other purposes.

The counter-weight shown at 87 in Figure 11 is of a sufficient size to offset the heavier weight of the motor, its gears and the clutch arrangement.

When the circuit is electrically broken by the cam lobes or risers, this will affect the circuit for one direction of rotation only, leaving the circuit open for moving the equipment in an opposite direction, whereby the light beam itself will be accordingly moved.

We are aware that many changes may be made and numerous details of construction varied throughout a wide range without departing from the principles of this invention, and we, therefore, do not propose limiting the patent granted hereon otherwise than as necessitated by the prior art.

We claim as our invention:

A remote controlled light, comprising a source of illumination, plural means for supporting the same for universal movement, operating motors in the supporting means, a plurality of control switches for the motors, said control switches being mounted at a distance from the light source with current carrying connections from the switches to the motors, a housing for the switches, said housing adapted to support the operator's foot in switch selecting position, one of the supports for the light source including a horizontally rotatable ring, another support including a vertically rotatable reflector pivotally supported by said ring, one of the motors being connected to the ring and another motor connected to the reflector, limit switches in the motor circuits, mechanical limit stops in connection with the motor drives, said mechanical limit stops adjustable for pre-determining the amount of movement of the ring and reflector by their respective motors, a slip clutch in the connections between the motors and the ring and reflector elements, all of the electrical connections being sealed against the ingress of explosive gases, each of the switches in the foot supporting housing comprising a push button, a cup shaped receptacle for the push button, a helical spring positioned about the receptacle and a contact switch adjacent one edge of the receptacle.

References Cited in the file of this patent

UNITED STATES PATENTS

| | | |
|---|---|---|
| 1,823,083 | Brown | Sept. 15, 1931 |
| 1,833,308 | Russell | Nov. 24, 1931 |
| 2,390,634 | Aufiero | Dec. 11, 1945 |
| 2,401,390 | Unger | June 4, 1946 |
| 2,572,825 | Guth | Oct. 23, 1951 |
| 2,614,208 | Lambesis | Oct. 14, 1952 |
| 2,733,311 | Brown | Jan. 31, 1956 |
| 2,754,411 | Dohrmann | July 10, 1956 |
| 2,790,068 | Ruscitti | Apr. 23, 1957 |

FOREIGN PATENTS

| | | |
|---|---|---|
| 462,762 | Canada | Jan. 31, 1950 |